US009174328B2

(12) United States Patent
Shi et al.

(10) Patent No.: US 9,174,328 B2
(45) Date of Patent: Nov. 3, 2015

(54) POWER TOOL HAVING A SPINDLE LOCK

(75) Inventors: Zhaojun Shi, Dongguan (CN); Canquan Huang, Dongguan (CN); Shan'en Gao, Donguan (CN)

(73) Assignee: Techtronic Power Tools Technology Limited, Tortola (VG)

( * ) Notice: Subject to any disclaimer, the term of this patent is extended or adjusted under 35 U.S.C. 154(b) by 628 days.

(21) Appl. No.: 13/583,027

(22) PCT Filed: Mar. 8, 2010

(86) PCT No.: PCT/CN2010/070913

§ 371 (c)(1), (2), (4) Date: Oct. 17, 2012

(87) PCT Pub. No.: WO2011/109930

PCT Pub. Date: Sep. 15, 2011

(65) Prior Publication Data

US 2013/0025901 A1 Jan. 31, 2013

(51) Int. Cl.

| | |
|---|---|
| ***B23Q 5/20*** | (2006.01) |
| ***B25B 21/00*** | (2006.01) |
| ***B25D 17/24*** | (2006.01) |
| ***B25F 5/00*** | (2006.01) |

(52) U.S. Cl.

CPC ................ *B25B 21/00* (2013.01); *B25D 17/24* (2013.01); *B25F 5/001* (2013.01); *B25D 2216/0046* (2013.01)

(58) Field of Classification Search

CPC ........... B25B 21/00; B24B 23/00; B23Q 5/20

USPC .................................................. 173/164, 216

See application file for complete search history.

(56) References Cited

U.S. PATENT DOCUMENTS

| | | | | |
|---|---|---|---|---|
| 6,913,090 | B2 * | 7/2005 | Droste et al. | 173/109 |
| 7,063,201 | B2 | 6/2006 | Nakamura et al. | |
| 7,287,602 | B2 | 10/2007 | Zeiter et al. | |
| 7,455,574 | B2 * | 11/2008 | Chu et al. | 451/342 |
| 7,578,357 | B2 * | 8/2009 | Schell | 173/1 |
| 8,011,444 | B2 * | 9/2011 | Pyles et al. | 173/164 |
| 2002/0130007 | A1 * | 9/2002 | Nakamura et al. | 192/38 |
| 2006/0131043 | A1 * | 6/2006 | Zeiter | 173/216 |
| 2007/0034398 | A1 * | 2/2007 | Murakami et al. | 173/210 |

(Continued)

FOREIGN PATENT DOCUMENTS

| | | |
|---|---|---|
| CN | 1254349 | 5/2006 |
| CN | 200977643 | 11/2007 |

(Continued)

OTHER PUBLICATIONS

International Search Report and Written Opinion for Application No. PCT/CN2010/070913 dated Dec. 16, 2010 (7 pages).

*Primary Examiner* — Gloria R Weeks

(74) *Attorney, Agent, or Firm* — Michael Best & Friedrich LLP

(57) ABSTRACT

A spindle lock (10) includes a detent arrangement including springs (25) acting on projections (30), each projection engaging one of a pair of recesses (40, 41) to control and buffer the rotation of a spindle (13) and to delay the engagement of locking elements (26*a*, 26*b*). A compact, reliable mechanism with a high degree of modularity is achieved by providing the recesses in an inner rotor (31) and the springs and projections in an outer rotor (18) that extends about the inner rotor.

9 Claims, 5 Drawing Sheets

(56) References Cited

U.S. PATENT DOCUMENTS

| | | | | |
|---|---|---|---|---|
| 2007/0267207 | A1* | 11/2007 | Ito | 173/217 |
| 2009/0260466 | A1* | 10/2009 | Nakamura | 74/332 |
| 2010/0078187 | A1* | 4/2010 | Chen et al. | 173/213 |
| 2011/0039482 | A1* | 2/2011 | Timmons | 451/344 |
| 2013/0025894 | A1* | 1/2013 | Campbell | 173/20 |

FOREIGN PATENT DOCUMENTS

| | | |
|---|---|---|
| EP | 1410879 | 12/2006 |
| JP | 5269677 | 10/1993 |

* cited by examiner

POWER TOOL HAVING A SPINDLE LOCK

TECHNICAL FIELD

The present invention relates to power tools and, more particularly, to power tools with a lock for preventing rotation of the spindle.

BACKGROUND OF THE INVENTION

A typical rotary power tool includes a housing, a motor supported by the housing and a spindle rotatably supported by the housing and selectively driven by the motor. A tool holder, such as a chuck, is mounted on the forward end of the spindle, and a tool element, such as a drill bit, is mounted in the chuck.

To assist the operator in removing and/or supporting the tool element in the tool holder, the power tool may include a spindle lock for preventing rotation of the spindle relative to the housing when a force is applied by the operator to the tool holder to remove the tool element. The spindle lock may be a manually-operated spindle lock, in which the operator engages a lock member against the spindle to prevent rotation of the spindle, or an automatic spindle lock, which operates when a force is applied by the operator to the tool holder.

There are several different types of automatic spindle locks. One type of automatic spindle lock includes a plurality of wedge rollers which are forced into wedging engagement with corresponding wedge surfaces when a force is applied by the operator to the tool holder. Another type of automatic spindle lock includes inter-engaging toothed members, such as a fixed internally-toothed gear and a movable toothed member supported on the spindle for rotation with the spindle and for movement relative to the spindle to a locked position in which the teeth engage to prevent rotation of the spindle.

To accommodate such automatic spindle locks, some rotational play or movement may be provided between the spindle and the driving engagement with the motor. The spindle lock operates (is engaged and disengaged) within this "free angle" of rotation between the spindle and the driving engagement of the motor.

One independent problem with the above-identified automatic spindle locks is that, when the motor is switched from an operating condition, in which the spindle is rotatably driven, to a non-operating condition, the inertia of the still-rotating spindle (and tool holder and/or supported tool element) causes the automatic spindle lock to engage to stop the rotation of the spindle relative to the motor within the free angle of rotation between the spindle and the motor. The engagement of the spindle lock can be sudden, causing an impact in the components of the spindle lock, resulting in noise (a big "clunk") and, potentially, damage to the components.

This problem is increased the greater the inertia acting on the spindle (i.e., with larger tool elements, such as hole saws). With the high-inertia tool elements, the spindle may rebound from the impact (of the spindle lock engaging), rotate in the opposite direction (through the free angle of rotation) and impact the driving engagement with the motor, and rebound (in the forward direction) to re-engage the spindle lock. Such repeated impacts on the spindle lock and between the spindle and the driving engagement of the motor causes a "chattering" phenomenon (multiple noises) after the initial impact and big "clunk".

Another independent problem with existing power tools is that, when the motor is switched from the operating condition to the non-operating condition, a braking force may be applied to the motor while the spindle (under the force of the inertia of the spindle (and tool holder and/or supported tool element) continues to rotate through the free angle. The braking of the motor. (coupled with the continued rotation of the spindle) causes the automatic spindle lock to engage resulting in noise (a big "clunk" and/or "chattering") and, potentially, damage to the components.

The braking force applied to the motor can result from dynamic braking of the motor, such as by the operation of a dynamic braking circuit or as results in the operation (stopping) of a cordless (battery-powered) power tool. In other words, when the motor is stopped, the difference between the force rotating the spindle (the inertia of the spindle (and tool holder and/or supported tool element) and the force stopping the motor (i.e., whether the motor coasts or is braked) causes the automatic spindle lock to engage. The greater difference in these oppositely acting forces, the greater the impact(s) (a big "clunk" and/or "chattering") when the spindle lock engages.

U.S. Pat. No. 7,063,201 describes a power tool with a spindle lock that addresses these problems. The spindle lock includes a spring and a detent arrangement to control and buffer the rotation of the spindle and to delay the engagement of the locking elements in both forward and reverse operation. Multiple spring members may cooperate to apply a force to delay the operation of the spindle lock. However, one of the drawbacks that have been found to occur with this spindle lock is that the amount of delay can be variable. In addition, when producing a model range of power tools, it is advantageous to use common parts as far as possible, however with this old tool it has been difficult to readily vary the delay by changing the spring members alone, without a need to also alter the mutually engaged component parts. It is an object of the present invention to overcome or substantially ameliorate the above disadvantages or more generally to provide an improved spindle lock.

DISCLOSURE OF THE INVENTION

According to one aspect of the present invention there is provided a power tool comprising:

a housing, a motor supported by the housing and including a motor shaft;

a spindle supported by the housing to turn about an axis, the spindle being selectively turned by the motor about the axis in first and second opposing directions;

a first locking member;

a second locking member movable between a locked position, in which the second locking member engages the first locking member to prevent rotation of the spindle, and an unlocked position;

a transmission for transmitting torque between the motor shaft and the spindle, the transmission including an inner rotor and an outer rotor that is mounted substantially about the inner rotor, the inner and outer rotors being mounted coaxially and for limited rotation relative to one another;

at least one pair of recesses, comprising first and second recesses provided on one of the inner and outer rotors, at least one spring and at least one projection provided on the other of the inner and outer rotors, each projection being biased by the spring into a selected one of the first recess and the second recess, the springs being operable to delay movement of the second locking member from the unlocked position to the locked position when a force is applied to the spindle to cause the spindle to rotate relative to the motor shaft;

whereby, when the spindle is rotated in the first direction relative to the motor shaft, each projection is movable between a first position, which corresponds to the unlocked position of the second locking member and in which each projection is positioned in the first recess, and a second position, in which each projection is positioned in the second recess, movement of each projection from the first recess delaying movement of the second locking member from the unlocked position to the locked position; and whereby, when the spindle is rotated in the second direction relative to the motor shaft, each projection is movable between the second position, which corresponds to the unlocked position of the second locking member and in which each projection is positioned in the second recess, and the first position, in which each projection is positioned in the first recess, movement of each projection from the second recess delaying movement of the second locking member from the unlocked position to the locked position.

Preferably the first locking member comprises a wedge roller, brake shoe, or the like and the second locking member comprises a ramp surface, wedge, lever, or the like, which engages the first locking member, pressing it into contact with a rotating circumference to prevent rotation of the spindle.

Preferably the transmission further comprises a speed reduction gear transmission, driven by the motor shaft, and one or more output members of the transmission driving one of the inner and outer rotors. Preferably outer rotor is fixed to rotate with the one or more output members. Preferably the gear transmission comprises at least one planetary gearset, and the output members comprise axles supporting the planet gears, the axles being fixed to rotate with the outer rotor.

Preferably the first and second recesses are circumferentially spaced apart in an outer surface of the inner rotor and the projections extend from an inner surface of the outer rotor. This provides a compact design, since more space is available in the outer rotor for mounting the springs.

Preferably the projections are biased substantially in a radial direction. Preferably a radially elongated aperture is provided in the outer rotor for receiving each spring. Preferably the springs are helical. Optionally, the springs may have a spiral form.

Preferably the first and second recesses in the inner rotor are separated by a lobe having a form with reflective symmetry about a radial plane bisecting the lobe.

This invention provides a spindle lock for a power tool which is effective and efficient in operational use. It has been found that the torque between the inner and outer rotors can be more reliably maintained, and that there is correspondingly little variation in the delay provided by the springs mounted in this mechanism throughout the life of the tool. By providing the inner rotor generally within the outer rotor this advantage can be maintained without compromising the compactness of the tool. Moreover, a high degree of modularity is achieved, allowing a range of power tools to be provided using a number of common parts but using different springs for varying the torque applied between the inner and outer rotors during their "free" angle of rotation depending upon the torque capacity of the tool.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
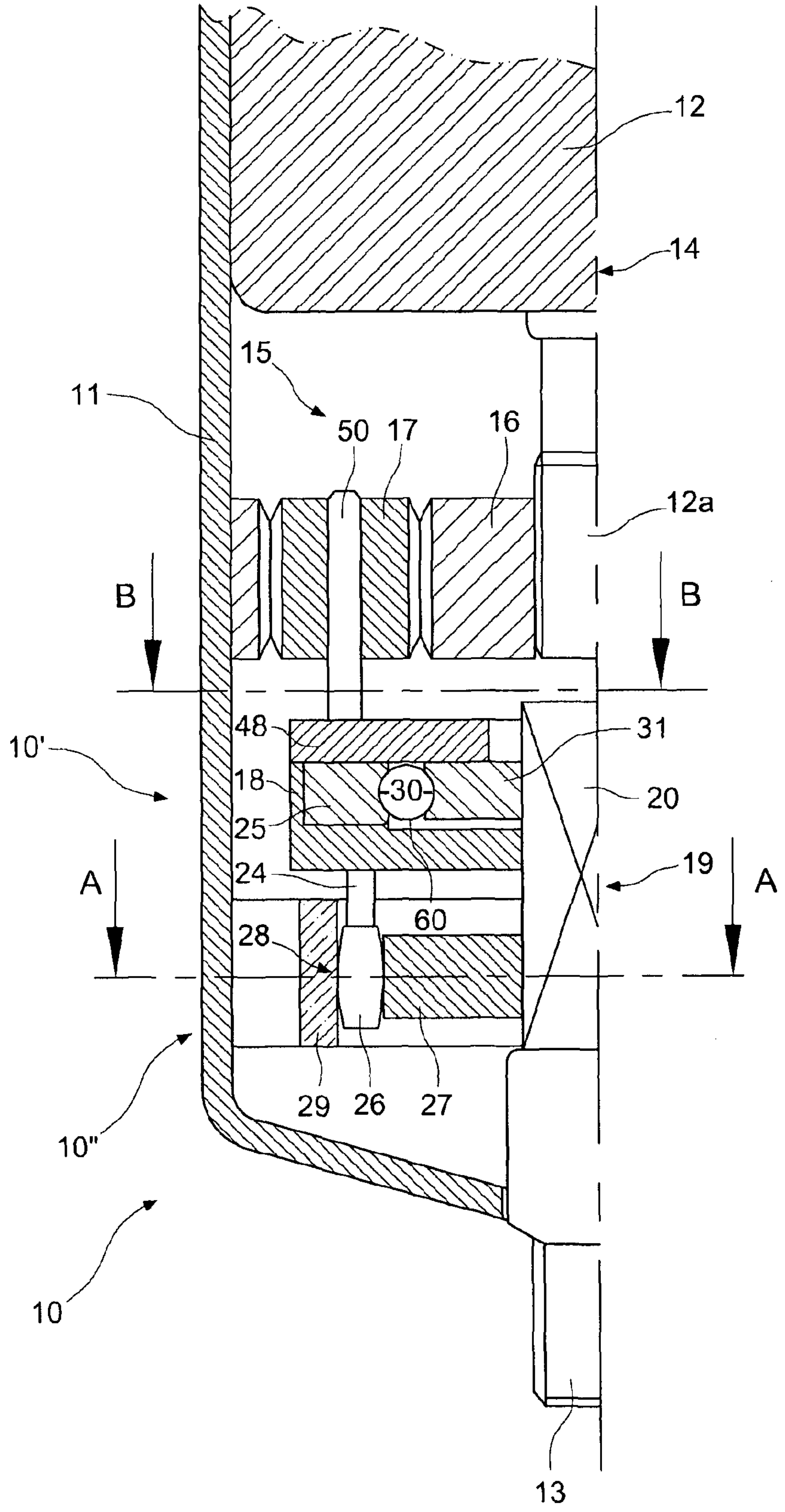
FIG. 1 is a schematic sectional view in a longitudinal plane through the drive axis of a power tool according to the invention.
Figure 2:
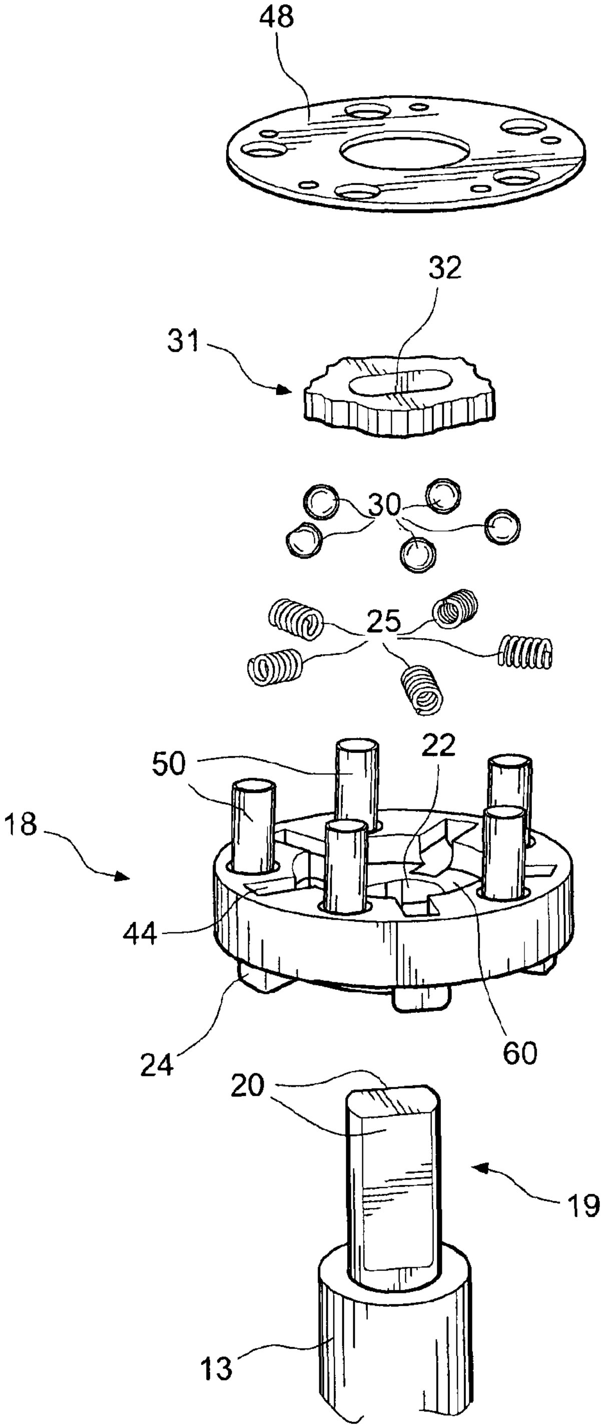
FIG. 2 is an exploded pictorial view of the inner rotor and outer rotor assembly of the tool of FIG. 1.
Figure 3:
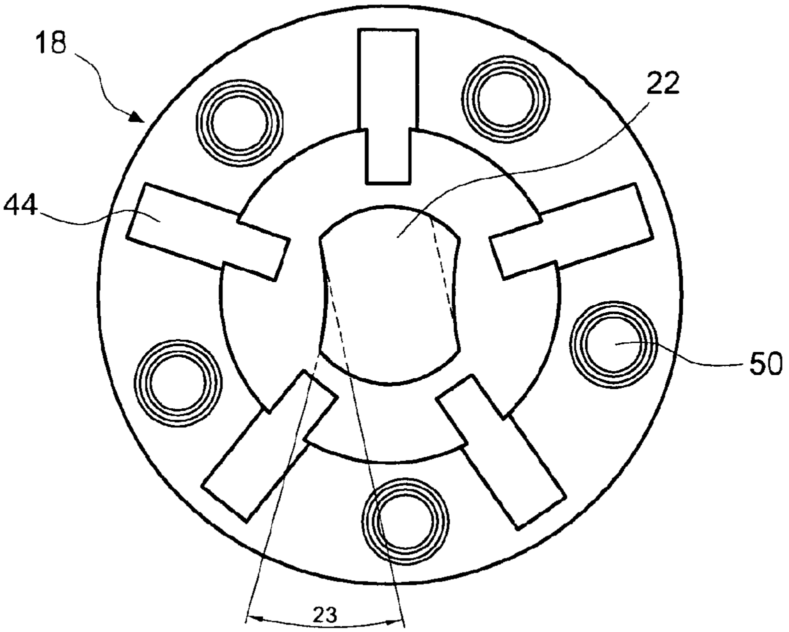
FIG. 3 is an end view of the drive rotor of the tool of FIG. 1.
Figure 4:
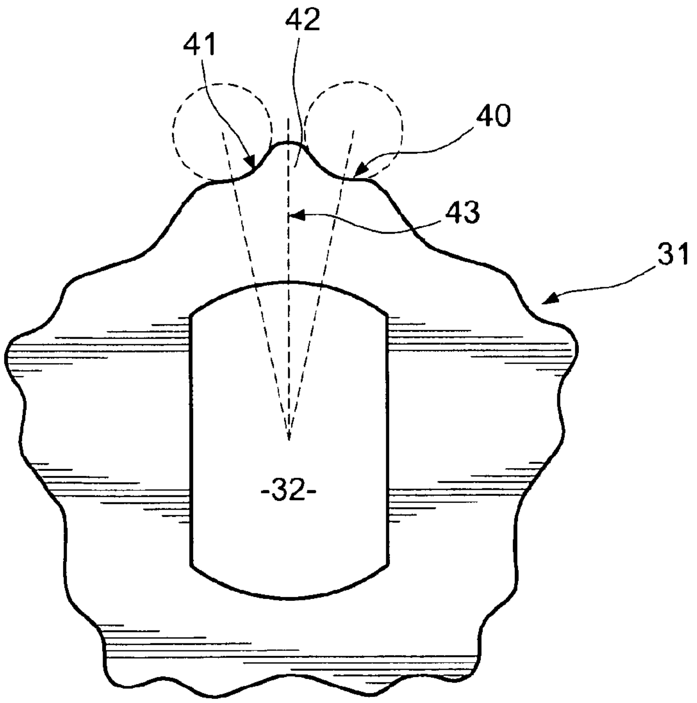
FIG. 4 is an end view of the inner rotor of the tool of FIG. 1.

Referring to the drawings, FIG. 1 schematically illustrates a power tool having a spindle lock system 10 embodying the invention. As shown in FIG. 1, the power tool includes a housing 11 supporting a motor 12. A spindle 13 is rotatably supported by the housing 11 and is reverseably driveable by the motor 12. A tool holder or chuck (not shown) may be supported on the forward end of the spindle 13 for rotation with the spindle 13. The power tool may be a drill (as illustrated) or another type of power tool, such as, for instance, a screwdriver, a grinder or a router.

The motor 12 includes an output shaft 12*a* defining a motor axis 14 and connected to a planetary speed reduction transmission 15 that includes a sun gear 16 connected, as by splines, to the output shaft 12*a*; a planet gear 17 supported by axles 50 fixed to a drive rotor or outer rotor 18 and engageable between the sun gear 16 and an internally toothed ring gear 19 fixed to the housing 11. The outer rotor 18 thus provides the "planet carrier" that rotates with the motor shaft 12*a*, while the axles 50 are output members transmitting torque to the outer rotor 18.

The spindle lock system 10 is supported on the output side of the speed reduction transmission 15 and includes a driving torque structure 10' for conveying torque from the outer rotor 18 to the spindle 13, and locking structure 10" for locking the spindle 13 and selectively preventing rotation of the spindle 13 relative to the housing 11 and relative to the outer rotor 18.

The driving torque structure 10' between the spindle 13 and the outer rotor 18 includes a male connector 19 formed on the end of the spindle 13 (as two parallel flats 20 on opposite sides of the spindle axis) and a female connector 22 formed on the outer rotor 18. The connector 22 has sidewalls which are formed to provide a free angle 23 (of about 20 degrees in the illustrated construction) in which the spindle 13 and the outer rotor 18 are rotatable relative to one another to provide some rotational play between the spindle 13 and the outer rotor 18. When the connectors 31 and 32 are engaged, there is a free rotational space in which the outer rotor 18 will not convey rotating force to the spindle 13 but in which the outer rotor 18 and the spindle 13 are rotatable relative to one another for the free angle 23. In the illustrated construction, the shape of the connector 22 provides this free play in both rotational directions of the motor 12 and spindle 13.

The locking structure 10" generally includes a release member 24 fixed to the outer rotor 18, one or more springs 25 (five are employed in the illustrated embodiment), a projection or ball 30 associated with each spring 25, one or more locking members or wedge rollers 26, a lock ring 27, a rubber ring 28, a fixing ring 29, a detent rotor or inner rotor 31 and the spindle 13. Except for the wedge rollers 26 and the spindle 13, the other components of the locking structure 10" are generally in the shape of a ring extending about the spindle axis. It will be understood that the drawings only schematically illustrates the major components of the locking structure 10", and other less important parts are omitted for clarity.

The lock ring 27 and inner rotor 31 both include female connectors 32 complementary to the connector 19 on the spindle 13 so that both the lock ring 27 and inner rotor 31 are rotationally fast with the spindle 13. On the outer circumference, the lock ring 27 includes dividing protrusions 34 which, in the illustrated construction, are equally spaced from each other by about 90 degrees. On each circumferential side of each protrusion 34, inclined locking wedge surfaces 35*a* and 35*b* are defined to provide locking surfaces so that the spindle lock system 10 will lock the spindle 13 in the forward and reverse rotational directions. The wedge surfaces 35*a* and 35*b* are inclined toward the associated protrusion 34.

In the illustrated construction, the locking members are wedge rollers 26 formed in the shape of a cylinder. A wedge roller 26 is provided for each locking wedge surface 35*a* and 35*b* of the lock ring 27. The wedge rollers 26 are provided in four pairs, one for each protrusion 34. One wedge roller 26 in each pair provides a locking member in the forward rotational direction of the spindle 13, and the other wedge roller 26 in the pair provides a locking member in the reverse rotational direction of the spindle 13.

The rubber ring 28 is supported in a groove in the fixing ring 29, and engagement of the wedge rollers 26 with the rubber ring 28 causes rotation of the wedge rollers 26 due to the friction between the wedge rollers 26 and the rubber ring 28. The fixing ring 29 defines an inner circumference 36 receiving the lock ring 27. The inner circumference 36 of the fixing ring 29 and the outer circumference of the lock ring 27 (and/or of the spindle 13) face each other in a radial direction and are spaced a given radial distance such that a pair of wedge rollers 26 are placed between a pair of inclined locking wedge surfaces 35*a* and 35*b* of the lock ring 27 and the inner circumference 36.

The inclined locking wedge surfaces 35*a* and 35*b* and the inner circumference 36 of the fixing ring 29 cooperate to wedge the wedge rollers 26 in place in a locked position which corresponds to a locked condition of the spindle lock system 10, in which the spindle 13 is prevented from rotating relative to the housing 11 and relative to the motor 12 and outer rotor 18. Space is provided between the inner circumference 36 of the fixing ring 29 and the outer circumference of the lock ring 27 to allow the wedge rollers to move to a releasing or unlocked position which corresponds to an unlocked condition of the spindle lock system 10, in which the spindle 13 is free to rotate relative to the housing 11.

The releasing member 24 includes releasing protrusions 39 which are selectively engageable with the wedge rollers 26 to release or unlock the wedge rollers 26 from the locked position. The releasing protrusions 39 are, in the illustrated construction, equally separated by about 90 degrees to correspond with the relative position of the four pairs of wedge rollers 26. Each releasing protrusion 34 is designed to release or unlock the associated wedge rollers 26 by engagement with the circumferential end part to force the wedge roller 26 in the direction of rotation of the releasing member 24 (and the outer rotor 18). The circumferential length of each releasing protrusion 34 is defined so that the releasing or unlocking function is accomplished within the free rotational angle 23 between the spindle 13 and the releasing member 24 and the outer rotor 18. Preferably, the releasing or unlocking function is accomplished near the end of the free rotational angle 23.

The detent rotor or inner rotor 31 is disposed generally within the drive rotor or outer rotor 18 with which it cooperates to provide a detent arrangement or controlling structure for controlling the resilient force of the springs 25 between a detent position corresponding to an unlocked condition of the spindle lock system 10 and a detent position corresponding to the locked condition of the spindle lock system 10. In the illustrated construction, controlling concave recesses 40 and 41 are defined on outer circumferential face of the inner rotor 31. Five pairs of recesses 40, 41 are equally circumferentially spaced about the inner rotor 31. The recesses 40, 41 of each pair are separated by a radially outwardly extending lobe 42 having a form with reflective symmetry about a radial plane 43 bisecting the lobe 42.

The outer rotor 18 includes five equally angularly spaced slots 44 elongated radially. The through-extending axial opening through the outer rotor 18 has a stepped form with an outer section providing the female coupling 22 and adjacent inner section 60 having inner surface 45 of larger transverse dimension than the coupling 22, and adapted to accept the inner rotor 31.

A spring 25 is received in each aperture 44 and engages a ball 30 such that at least part of the balls 30 extends from the inner surface 45. The springs 25 provides a resilient force to bias the projections, or balls 30 into engagement with a selected one of the recesses 40 and 41. The slots 44 are open along an axial face and the slots 44 and inner section of the aperture 60 are closed by a retaining ring 48 secured, as by fasteners (not shown), to the outer rotor 18.

The torque provided by the engagement between the balls 30 and recesses 40, 41 is such as to allow the projections to move from one recess (i.e., recess 41) to the other recess (i.e., recess 40), when the motor 12 is restarted. The resilient force the springs 25 apply to the balls 30 is set to allow the balls 30 to move from one recess (i.e., recess 40) to the other recess (i.e., recess 41) to control and buffer the rotational force of the spindle 13 when the motor 12 is stopped and to delay the engagement of the locking structure 10".

Figure 5:
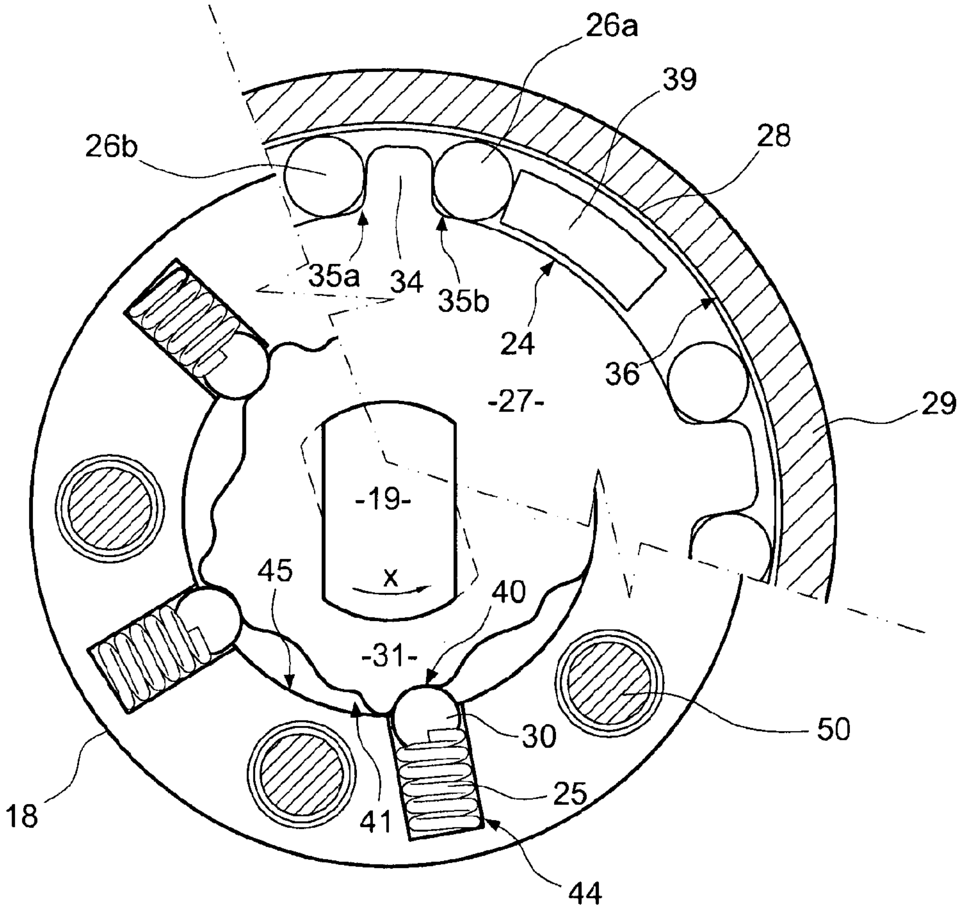
FIG. 5 is a composite of fragmentary sectional views along planes AA and BB of FIG. 1.

In operation, when the outer rotor 18 is rotated in the direction of arrow X (in FIG. 5) by operation of the motor 12, the corresponding wedge roller 26*a* is pushed into a releasing or unlocked position of the inclined surface 35*a* of the lock ring 27 by the end of the releasing protrusion 34. The other wedge roller 26*b* is kept in contact with the inner circumference 36 of the fixing ring 29, and, by its frictional contact, the wedge roller 26*b* is pushed into the releasing position of the inclined surface 35*b*. This releasing or unlocking function is accomplished within the free rotational angle 23 between the spindle 13 and the outer rotor 18 and the motor 12.

After the locking structure 10" is released or unlocked, the connecting part 32 of the outer rotor 18 and the connecting part 31 of the spindle 13 move into driving engagement so that the driving force of the outer rotor 18 (and motor 12) is transferred to the spindle 13 and the spindle 13 rotates with the outer rotor 18. At this time, each ball 30 is positioned in one recess (i.e., recess 40, the "run" position recess) of the inner rotor 31, and the position of the releasing member 24 and the lock ring 27 is controlled by the resilient force of the springs 25 in a releasing or unlocked position at one end of the free angle 23.

During driving operation of the motor 12, the releasing protrusion 34 provides a force necessary to push the wedge roller 26*a* into the releasing or unlocked position and does not provide a large impact force on the wedge rollers 26*a*. When the motor 12 is stopped (switched from the operating condition to the non-operating condition) rotation of the outer rotor 18 is stopped. Rotation of the spindle 13 is controlled and buffered by the resilient force of the springs 25 retaining the balls 30 in the selected recess (i.e., recess 40). During stopping, if the inertia of the spindle 13 (and the attached chuck and tool bit) is less than the resilient force of the springs 25, rotation of the spindle 13 is stopped with the balls 30 being retained in the selected recess (i.e., recess 40, the run position). In such a case, the resilient force of the springs 25 buffers and controls the inertia of the spindle 13 even when there is little or no relative rotation between the spindle 13 and the outer rotor 18 and the motor 12.

When the inertia of the spindle 13 (and the attached chuck and tool bit) is greater than the resilient force of the springs 25, the inertia overcomes the resilient force of the springs 25 and the friction between the balls 30 and the inclined ramp surface surface adjacent to the selected recess 40 so that the balls 30 move from the recess 40 and to the other recess 41 (the "lock" position recess). Movement of the balls 30 from recess 40 and to the recess 41 resists the rotational inertia of the spindle 13 and controls and buffers the rotational inertia of the spindle 13 so that the rotation of the spindle 13 will be dissipated before the locking structure 10" engages.

Therefore, the rotational inertia of the spindle 13 (and the attached chuck and tool bit) is controlled and buffered by the engagement of the balls 30 in the respective recesses 40 and movement to the recesses 41 under the resilient spring force applied the respective springs 25. The springs 25 controls the rotational force of the spindle 13 and delays the engagement of the wedge rollers 26 and the locking wedge surfaces 37 so that there is no impact in the components of the spindle lock system 10, and no noise (no big "clunk") is created when the rotation of the spindle 13 has stopped. Also, because the rotational force of the spindle 13 is controlled, there is no impact of the spindle lock and rebound through the free rotational angle 23 so that the "chattering" phenomenon is also avoided. The rotational control device of the spindle lock system 10 includes the detent arrangement provided by the recesses 40 and 41 and the balls 30 and the resilient spring force provided by the springs 25.

When the operator operates a chuck this tends to rotate the spindle 13 relative to the outer rotor 18 but, rotation of the spindle 13 is prevented because of the functioning of the locking structure 10". The wedge rollers 26 will be wedged between the inner circumference 36 of the fixing ring 29 and the respective inclined locking wedge surfaces **35*a* and 35*b* of the lock ring 27 so that rotation of the spindle 13 in each rotational direction will be prevented. Because the spindle 13** is prevented from rotating, the chuck can be easily operated to remove and/or support a bit.

When the motor 12 is restarted, the end of the releasing protrusion 34 (in the selected rotational direction) moves one wedge roller **26*a* to a releasing position. The other wedge roller 26*b* engages the inner circumference 36 of the fixing ring 29 and is pushed into a releasing position. Once the wedge rollers 26 are released, the spindle 13 is free to rotate. The spindle 13 begins to rotate under the force of the motor 12 at the end of the free angle 23 of rotation between the spindle 13 and the outer rotor 18 and motor 12**.

When the spindle 13 is driven and the wedge rollers 26 rotate about their respective axes and revolve about the spindle 13, the wedge rollers 26 are kept in contact with the rubber ring 28, and this contact resistance causes the wedge rollers 26 to rotate while revolving. This rotation of the wedge rollers 26 and engagement with the supporting protrusions 38 of the supporting rings 23 on a trailing portion of the respective wedge rollers 26 maintains the respective axes of the wedge rollers 26 in an orientation in which the roller axes are substantially parallel to the axis of the spindle 13.

Figure 6:
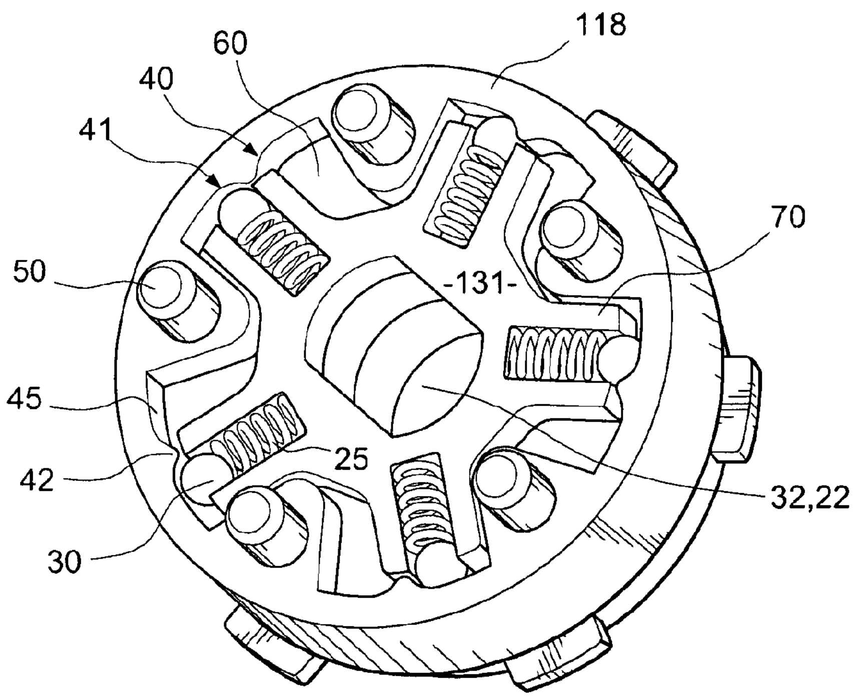
FIG. 6 is a pictorial view of an inner rotor and outer rotor assembly according to a first alternative embodiment.

FIG. 6 illustrates a first alternative embodiment of the inner and outer rotors 131, 118 of like construction and operation to the inner and outer rotors 31, 18 of FIGS. 1-5, but in which, the recesses 40, 41 are provided on the outer rotor 118 (instead of on the inner rotor) and the springs 25 and balls 30 are provided on the inner rotor 131 (instead of on the outer rotor). The recesses 40, 41 and associated lobes 42 are circumferentially spaced about the inner surface 45 of the recess 60 in which the inner rotor 131 is received. The inner rotor 131 includes five radial projections 70, in each of which a slot is provided in which the spring 25 and ball 30 are disposed.

Aspects of the present invention have been described by way of example only and it should be appreciated that modifications and additions may be made thereto without departing from the scope thereof.

The invention claimed is:

1. A power tool comprising:

a housing (11);

a motor (12) supported by the housing and including a motor shaft (**12*a***);

a spindle (13) supported by the housing to turn about an axis (14), the spindle being selectively turned by the motor about the axis in first and second opposing directions;

a first locking member (**26*a*, 26*b***);

a second locking member (27) movable between a locked position, in which the second locking member engages the first locking member to prevent rotation of the spindle, and an unlocked position;

a transmission (15) for transmitting torque between the motor shaft (**12*a*) and the spindle (13), the transmission including an inner rotor (31) and an outer rotor (18**) that is mounted substantially about the inner rotor, the inner and outer rotors being mounted coaxially and for limited rotation relative to one another;

at least one pair of recesses (40, 41), comprising first and second recesses provided on one of the inner and outer rotors, at least one spring (25) and at least one projection (30) provided on the other of the inner and outer rotors, each projection being biased by the spring into a selected one of the first recess (40) and the second recess (41), the springs being operable to delay movement of the second locking member (27) from the unlocked position to the locked position when a force is applied to the spindle to cause the spindle to rotate relative to the motor shaft;

whereby, when the spindle is rotated in the first direction (X) relative to the motor shaft (**12*a*), each projection (30) is movable between a first position, which corresponds to the unlocked position of the second locking member and in which each projection (30) is positioned in the first recess (40), and a second position, in which each projection (30) is positioned in the second recess (41**), movement of each projection from the first recess delaying movement of the second locking member from the unlocked position to the locked position; and whereby, when the spindle is rotated in the second direction relative to the motor shaft, each projection is movable between the second position, which corresponds to the unlocked position of the second locking member and in which each projection is positioned in the second recess, and the first position, in which each projection is positioned in the first recess, movement of each projection from the second recess delaying movement of the second locking member from the unlocked position to the locked position.

2. The power tool of claim 1 wherein the first locking member comprises a wedge roller (**25*a*, 26*b*), and the second locking member comprises a ramp surface (35*a*, 35*b*) which engages the first locking member (26*a*, 26*b*), pressing it into contact with a rotating circumference (36) to prevent rotation of the spindle (13**).

3. The power tool of claim 1 wherein the transmission further comprises a gear transmission (15) driven by the motor shaft (12*a*), with one or more output members (50) of the gear transmission driving one of the inner and outer rotors.

4. The power tool of claim 3 wherein the outer rotor (18) is fixed to rotate with the one or more output members (50).

5. The power tool of claim 4 wherein the gear transmission comprises at least one planetary gearset (15), and the output members comprise axles (50) supporting planet gears (17), the axles being fixed to rotate with the outer rotor (18).

6. The power tool of claim 1 wherein the first and second recesses (40, 41) are circumferentially spaced apart in an outer surface of the inner rotor (31) and the projections (30) extend from an inner surface (45) of the outer rotor (18).

7. The power tool of claim 1 wherein the projections (30) are biased substantially in a radial direction.

8. The power tool of claim 7 wherein a radially elongated aperture (44) is provided in the outer rotor (18) for receiving each spring (25).

9. The power tool of claim 1 wherein the first and second recesses (40, 41) in the inner rotor are separated by a lobe (42) having a form with reflective symmetry about a radial plane (43) bisecting the lobe.

* * * * *